United States Patent [19]

Troost

[11] 4,185,473
[45] Jan. 29, 1980

[54] BALANCED TORSIONAL DEFLECTION OF FLEXIBLE SHAFTS IN EITHER DIRECTION OF ROTATION

[75] Inventor: Robert C. Troost, Staten Island, N.Y.

[73] Assignee: Pennwalt Corporation, Phila, Pa.

[21] Appl. No.: 917,763

[22] Filed: Jun. 21, 1978

[51] Int. Cl.² ............................................. F16C 1/02
[52] U.S. Cl. ............................... 64/2 R; 114/144 R; 115/18 R
[58] Field of Search ................... 64/2 R; 114/144 R; 115/18 R

[56] References Cited

U.S. PATENT DOCUMENTS 3,443,451  5/1969  Zicker ................................. 64/2 R

FOREIGN PATENT DOCUMENTS 595752  10/1925  France ........................................ 64/2 R
728739  12/1932  France ........................................ 64/2 R
751962  7/1956  United Kingdom ........................ 64/2 R
1028327  5/1966  United Kingdom ........................ 64/2R

*Primary Examiner*—Ira S. Lazarus
*Assistant Examiner*—R. C. Turner
*Attorney, Agent, or Firm*—Arthur M. Suga

[57] ABSTRACT

Remote control flexible shaft having a balanced torsion deflection in either direction of rotation when subjected to torsional loads. Balanced torsional deflection provides the same "feel" of the control element, whether a wheel, valve, knob, or the like, and the same "lag" period before response of the controlled element, regardless of direction of rotation of the control element. The shaft employs interconnected equal lengths of conventional flexible shafting of identical construction except for the opposite lay of the wires comprising each respective layer of each length. Specific torsional deflection characteristics may be obtained by varying lengths and/or construction of the two flexible shaft lengths, or more than two lengths of shafting may be employed.

6 Claims, 4 Drawing Figures

BALANCED TORSIONAL DEFLECTION OF FLEXIBLE SHAFTS IN EITHER DIRECTION OF ROTATION

CROSS-REFERENCE TO OTHER APPLICATIONS

Reference is hereby made to patent application of Walter Kulischenko for "Remotely Actuated Marine Steering System", Ser. No. 880,410, filed Feb. 23, 1978, and assigned to the assignee hereof.

STATEMENT OF THE INVENTION

This invention relates to rotatable flexible shafts for remote control applications and more particularly concerns such shafts having balanced torsional deflection characteristics in either direction of rotation when subjected to torsional loads.

BACKGROUND OF THE INVENTION

Flexible shafts comprise basic elements of power transmission and are designed to transmit power or control from a driving element to an element to be driven. Transmission may be over, under, or around obstacles or objects where transmission by solid shafts would be impractical or impossible.

In a typical rotatable flexible shaft, a wire mandrel has a plurality of layers of closely coiled wire wound thereover, each of the layers being successively wound over another in alternately opposing directions, i.e., right or left-hand lay. This shaft is usually covered by a flexible casing, metallic or covered, and a clearance between the shaft and casing is provided in order that the shaft may rotate freely within the casing.

Rotatable flexible shafts are of two basic types—power driven and remotely controlled. Power driven flexible shafts are designed primarily for motor-driven or high speed operation in one direction. Remote control flexible shafts, on the other hand, are designed primarily for hand-operated control, usually 100 rpm or less, or intermittent high speed use, in either direction of rotation.

Torsional deflection is measured in degrees per foot of shaft per pound-inch of load and is determined by torsionally loading the shaft with various load increments and measuring degrees of twist resulting therefrom.

In most remote control applications, a minimum amount of torsional deflection, or "lag", between the control and controlled element is permissible, regardless of the direction of rotation of the shaft. It is virtually impossible to entirely eliminate torsional deflection, unless solid shafts are employed, because of the alternate layers of wires either winding or unwinding when the shaft is subjected to the torsional load. Regardless of the direction of rotation of the flexible shaft, it should operate smoothly and be free of any tendency to "jump".

In a typical remote control application where a manually-operated steering wheel controls a remotely disposed rudder or other steering member on a marine vessel, it is desirable that rotation of the steering wheel offer the same degree of resistance in either direction of rotation, and not feel "spongier" when rotated in the "unwind" direction. Similarly, other elements driven by rotatable flexible shafts in response to remotely controlled hand-operated wheels, valves, knobs, and the like, will benefit from the practice of the present invention.

SUMMARY OF THE INVENTION

Unbalanced torsional deflection of prior art rotating flexible shafts is due primarily to the alternate lay of each successive layer of wires, i.e., a torsional load applied to the shaft in a "wind" direction which tends to tighten up the outer layer of wires will exhibit a lower deflection value than when subjected to an identical load in the unwind direction, which tends to loosen the wires of the outer layer.

By interconnecting two equal lengths of identically constructed flexible shafting such that each layer of wires is provided with a bi-directional lay, i.e., one-half left lay and one-half right lay, balanced torsional deflection of the shaft in either direction of rotation will result.

Additionally, controlled deflection may be obtained by rigidly interconnecting a pair of different dimensional lengths of flexible shafting, each interconnected length being of identical construction with the exception that the respective layers of each interconnected length are disposed in an opposite lay. Or, the two interconnected lengths may be of equal dimensional length, but their construction nonidentical, or a combination of shaft construction and dimensional lengths may be employed. Further, the invention is not intended to be limited to only two interconnected lengths of flexible shafting, since those skilled in the art will readily appreciate that three or more such interconnected lengths may be employed to achieve desired torsional deflection characteristics.

DETAILED DESCRIPTION OF THE INVENTION

Figure 1:
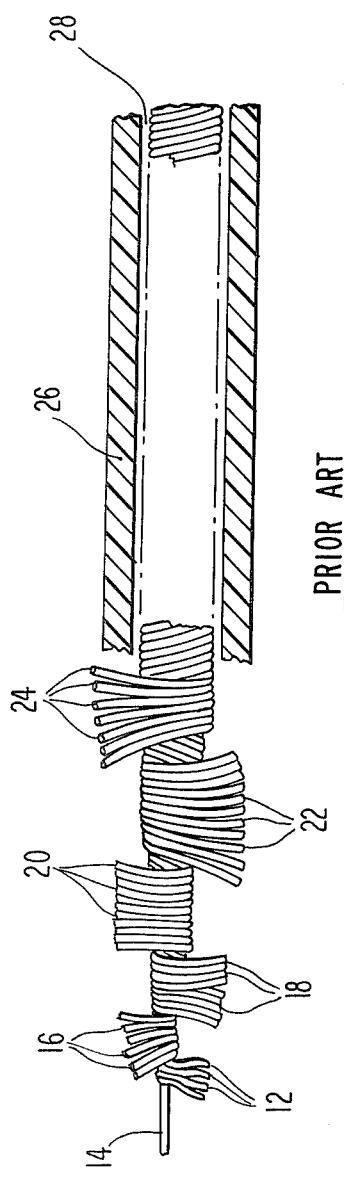
FIG. 1 is a perspective view, partially sectioned, illustrating typical construction of a prior art remote control flexible shaft.

In FIG. 1, a typical remote control flexible shaft comprises a plurality of coils of closely wound wire, the first layer 12 being wound onto a straight wire core mandrel or spine 14. Additional layers of wire 16, 18, 20, 22 and 24, and more if necessary, or less, are coiled successively, one upon another, in alternately opposing directions. A flexible sheath or casing 26 protects the shaft from dirt, corrosive elements and bruises of various sorts. In order that the flexible shaft may rotate freely within casing 26, a space 28 is provided between the shaft and casing.

Figure 2:
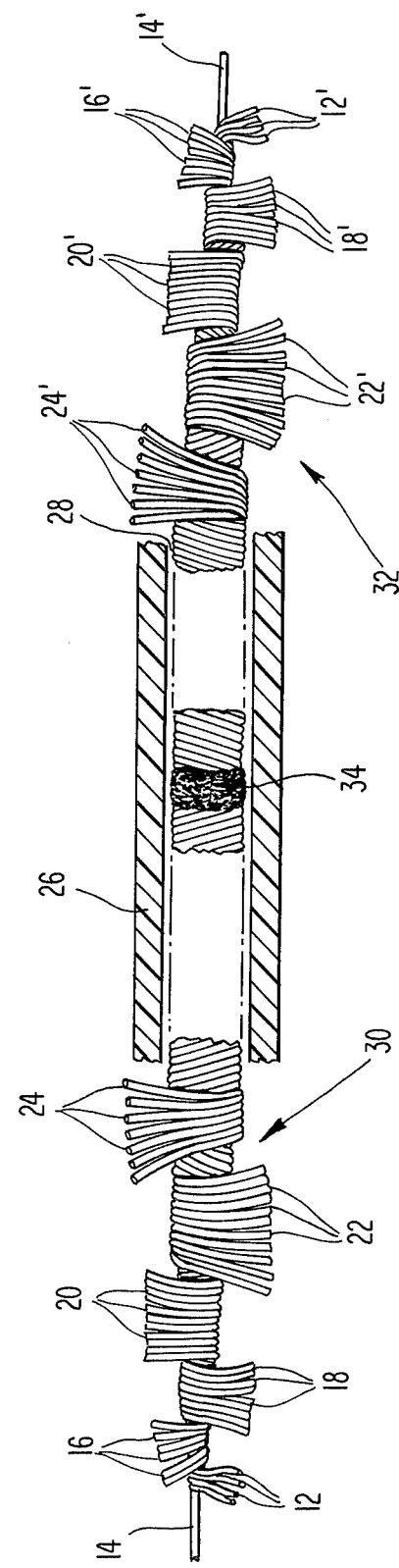
FIG. 2 is a view similar to FIG. 1, illustrating an embodiment of a torsionally balanced remote control shaft.

In FIG. 2, two equal lengths of flexible shafting 30 and 32 are connected, conveniently by means of a butt weld 34. Flexible shafts 30 and 32 are of identical construction except for direction of wire lay for each respective layer i.e., layer 24 is disposed right lay whereas layer 24' is left lay; layers 22 and 22' are left and right lay respectively; and so on, including layers 20 and 20';

18 and 18'; 16 and 16'; and layers 12 and 12'. Butt weld 34 is accomplished by conventional means.

Figure 3:
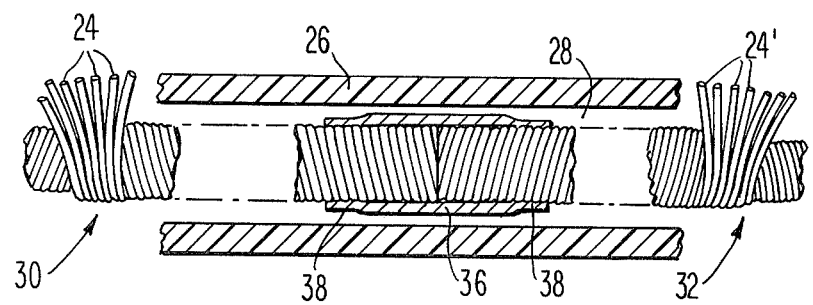
FIG. 3 is a view similar to FIG. 2, illustrating another embodiment of the invention.

In FIG. 3, a metal sleeve 36 interconnects shafts 30 and 32 and is rigidly crimped thereover at portions designated by numerals 38.

Figure 4:
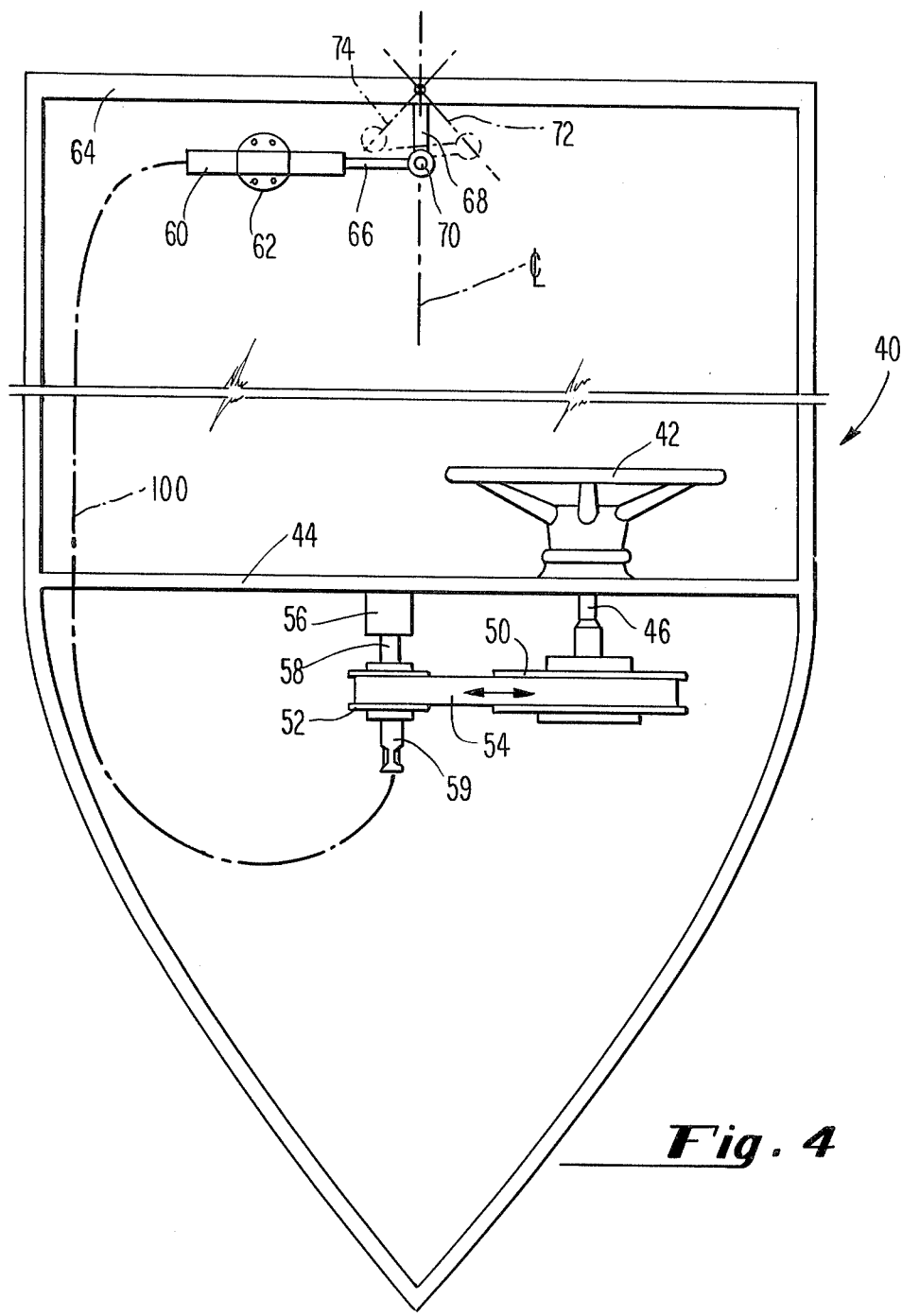
FIG. 4 is a plan view of a marine vessel employing the balanced torsional deflection flexible shaft of the present invention in a typical remote control steering application.

A typical application of the present inventive device is illustrated in FIG. 4 wherein a marine vessel 40 includes a manually-operated steering wheel 42 conveniently mounted to dashboard 44. Steering wheel shaft 46 is connected by conventional means to a driver pulley 50 such that one revolution of steering wheel 42 produces a similar revolution of the driver pulley. Driver pulley 50 causes driven pulley 52 to rotate therewith by virtue of a timing belt 54 operably engaged therebetween. Driven pulley 52 is provided with a smaller diameter than driver pulley 50, and thus, a single revolution of the driver pulley will produce a plurality of revolutions of the driven pulley.

Driven pulley 52 is journalled, or suitably rotatably mounted to dashboard 44 by pivot bearing 56, for example.

Shaft 58 of driven pulley 52 is connected, by means of a suitably end fitting 59, to the balanced torsional deflection flexible shaft 100 which comprises shafts 30 and 32 interconnected by means of butt weld 34 or sleeve 36. Flexible shaft 100 transmits torque from shaft 58 to a ball screw cylinder 60, secured by bracket 62 to boat 40 adjacent transom 64.

Ball screw cylinder 60 is conventional and converts rotary motion from balanced torsional deflection rotatable flexible shaft 100 to linear motion, which linear motion is transmitted to an output member 66 for controlling a steering arm 68 through pivot link 70. Steering arm 68 moves the outboard motor (not shown) or a rudder or other steering member (also not shown) by conventional means.

Steering arm 68 is illustrated at its mid-travel position. Dotted lines 72 and 74 indicate the positions of steering arm 68 at its end-travel positions.

Heretofore, if steering wheel 42 was turned in a direction which tended to unwind, rather than wind the outer layer of the flexible shaft, there resulted a longer "lag" period before steering arm 68 responded, as well as a "spongier" feel to the steering wheel. The present invention, when applied to the marine steering system abovedescribed, overcomes the differences in both lag and sponginess by providing a flexible shaft having balanced torsional deflection characteristics in either direction of rotation.

I claim:

1. A rotatable flexible shaft for remote control applications, said flexible shaft having balanced torsional deflection characteristics when rotated in either direction under torsional loads, said flexible shaft comprising,
    a pair of interconnected equal lengths of flexible shafting, each of said interconnected flexible shafting lengths comprising,
    a wire mandrel,
    a plurality of layers of wire wound tightly over said mandrel, each of said plurality of layers of wire of each of said interconnected shafting lengths being successively wound in alternately opposing directions, and
    each respective layer of wires of each of said interconnected shafting lengths being of identical construction and having an opposite lay.

2. The balanced torsional deflection shaft of claim 1 wherein said shafting lengths are interconnected by means of a butt weld therebetween.

3. The balanced torsional deflection shaft of claim 1 wherein said shafting lengths are interconnected by means of a sleeve crimped over an end of each thereof.

4. In a rotatable flexible shaft for use in a marine vessel steering system wherein manually-operable steering control means effects rotation of said rotatable flexible shaft for remotely controlling movement of a steering member through screw means which converts rotary motion from said rotatable flexible shaft to linear motion, said linear motion effecting movement of said steering member which controls direction of travel of said marine vessel, and wherein said steering system includes
    a driver pulley rotating in response to said manually-operable steering control means,
    a driven pulley,
    belt means operably engaged about said driver pulley and said driven pulley whereby a single revolution of said manually-operable steering control means and driver pulley causes a plurality of revolutions of said driven pulley,
    the combination therewith of the improvement to said rotatable flexible shaft for providing balanced torsional deflection thereto in either direction of rotation of said steering control means, said torsionably balanced flexible shaft characterized by an absence of sponginess and lag when rotated in either direction, said improvement comprising
    a pair of interconnected equal lengths of flexible shafting, each of said interconnected flexible shafting lengths comprising,
    a wire mandrel,
    a plurality of layers of wire wound tightly over said mandrel, each of said plurality of layers of wire of each of said interconnected shafting lengths being successively wound in alternately opposing directions, and
    each respective layer of wires of each of said interconnected shafting lengths being of identical construction and having an opposite lay,
    said rotatable flexible shaft having one end thereof connected to an output of said driven pulley for rotation therewith and other end of said rotatable flexible shaft connected to said screw means.

5. The balanced torsional deflection shaft of claim 4 wherein said shafting lengths are interconnected by means of a butt weld therebetween.

6. The balanced torsional deflection shaft of claim 4 wherein said shafting lengths are interconnected by means of a sleeve crimped over an end of each thereof.

* * * * *